United States Patent
Froeschle et al.

(10) Patent No.: US 7,965,010 B2
(45) Date of Patent: Jun. 21, 2011

(54) LINEAR MOTOR WITH PATTERNED MAGNET ARRAYS

(75) Inventors: Thomas A. Froeschle, Southborough, MA (US); Stephen J. Maguire, Grafton, MA (US); Mark A. Hayner, Belmont, MA (US); Richard Tucker Carlmark, Cumberland, RI (US); Rajiv Suri, Framingham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 12/203,523

(22) Filed: Sep. 3, 2008

(65) Prior Publication Data
US 2010/0052437 A1  Mar. 4, 2010

(51) Int. Cl.
H02K 41/03 (2006.01)
(52) U.S. Cl. ............ 310/156.43; 310/12.25; 310/12.26; 310/156.45
(58) Field of Classification Search ......... 310/12.24–26, 310/156.07, 156.45, 156.43
See application file for complete search history.

(56) References Cited

U.S. PATENT DOCUMENTS

| | | | |
|---|---|---|---|
| 4,190,779 A | 2/1980 | Schaeffer | |
| 4,220,899 A | 9/1980 | von der Heide et al. | |
| 4,475,051 A | 10/1984 | Chai et al. | |
| 4,834,871 A | 5/1989 | Schnabel et al. | |
| 5,062,095 A | 10/1991 | Horikawa et al. | |
| 5,128,575 A | 7/1992 | Heidelberg et al. | |
| 5,300,910 A * | 4/1994 | Unkelbach et al. ........... 335/306 | |
| 5,345,206 A | 9/1994 | Morcos | |
| 5,462,013 A | 10/1995 | Punola et al. | |
| 5,602,681 A | 2/1997 | Nakayama et al. | |
| 5,910,691 A | 6/1999 | Wavre et al. | |
| 5,955,798 A | 9/1999 | Ishiyama et al. | |
| 6,104,108 A | 8/2000 | Hazelton et al. | |
| 6,157,099 A | 12/2000 | Hartman | |
| 6,313,551 B1 * | 11/2001 | Hazelton ................... 310/12.24 |
| 6,313,725 B1 | 11/2001 | Nagashima et al. | |
| 6,496,093 B2 | 12/2002 | Compter et al. | |
| 6,674,186 B2 | 1/2004 | Yajima et al. | |

(Continued)

FOREIGN PATENT DOCUMENTS
EP   1263116 A2   12/2002
(Continued)

OTHER PUBLICATIONS

Honda et al., "Using the Halbach Magnet Array to Develop an Ultrahigh-Speed Motor for Machine Tools", Oct. 1997, IEEE Industry Applications Society Annual Meeting, pp. 56-60.*

(Continued)

*Primary Examiner* — Quyen Leung
*Assistant Examiner* — Eric Johnson

(57) ABSTRACT

An armature for a linear motor is described. The armature includes a first of a pair of magnetic structures comprising a first plurality of maglettes each having a magnetic polarity vector; an angle between two adjacent magnetic polarity vectors in the first plurality of maglettes having a first magnitude; and a second of the pair of magnetic structures comprising a second plurality of maglettes each having a magnetic polarity vector; an angle between two adjacent magnetic polarity vectors in the second plurality of maglettes having a second magnitude, the first plurality of maglettes including a first outer maglette that is adjacent to a second outer maglette of the second plurality of maglettes, an angle between the magnetic polarity vectors of the first and second outer maglettes having a third magnitude that is different than at least one of the first and the second magnitudes.

14 Claims, 11 Drawing Sheets

U.S. PATENT DOCUMENTS

| | | | |
|---|---|---|---|
| 6,828,890 B2 | 12/2004 | Cope et al. | |
| 6,870,284 B2 * | 3/2005 | Uchida | 310/12.24 |
| 6,930,411 B2 | 8/2005 | Berghaus et al. | |
| 7,067,942 B2 * | 6/2006 | Korenaga et al. | 310/12.25 |
| 7,170,202 B2 | 1/2007 | Watarai et al. | |
| 7,170,262 B2 | 1/2007 | Pettigrew et al. | |
| 2002/0117903 A1 | 8/2002 | Uchida | |
| 2002/0180294 A1 * | 12/2002 | Kaneda et al. | 310/156.43 |
| 2004/0004405 A1 | 1/2004 | Ausderau | |
| 2005/0046282 A1 * | 3/2005 | Tang et al. | 310/12 |
| 2006/0033386 A1 | 2/2006 | Uchida | |
| 2006/0082225 A1 | 4/2006 | Korenaga et al. | |

FOREIGN PATENT DOCUMENTS

| | | |
|---|---|---|
| EP | 1447902 | 8/2004 |
| JP | 10248220 | 9/1998 |
| JP | 2006121814 | 5/2006 |
| JP | 2007110822 A * | 4/2007 |
| JP | 2007159241 A * | 6/2007 |
| WO | 2008074954 A1 | 6/2008 |

OTHER PUBLICATIONS

International Search Report and Written Opinion dated Jan. 20, 2010 for PCT/US2009/054771.

Zhu, et al: "Novel Permanent Magnet Machines Using Halbach Cylinders". Power Electronics and Motion Control Conference, 2000. IEEE, vol. 2, Aug. 15, 2000, pp. 903-909.

Jang, et al.: Design criteria for detent force reduction of permanent-magnet linear synchronous motors with Halbach array, IEEE transactions on magnetics, vol. 38, No. 5, Sep. 2002, pp. 3261-3263.

Marinescu, et al.: New concept or permanent magnet excitation for electrical machines—analytical and numerical computation, IEEE transactions on magnetics, vol. 28, No. 2, Mar. 1992, pp. 1390-1393.

International Search Report on Patentability, dated Mar. 17, 2011 for PCT PCT/US2009/054771, 10 pages.

* cited by examiner

LINEAR MOTOR WITH PATTERNED MAGNET ARRAYS

FIELD OF THE INVENTION

This description relates to motors and more specifically to linear motors.

BACKGROUND

A conventional linear motor includes a magnet array that creates a magnetic field. A coil array is positioned to cooperate with the magnetic field. Either the magnet array or the coil array can be the stationary or the moving part of the linear motor. Current driven through the coil array generates a force on the magnet array thereby causing the magnet array to move relative to the coil array.

SUMMARY

In general, in one aspect, the invention features an armature for a linear motor which comprises a first of a pair of magnetic structures comprising a first plurality of maglettes each having a magnetic polarity vector; an angle between two adjacent magnetic polarity vectors in the first plurality of maglettes having a first magnitude; and a second of the pair of magnetic structures comprising a second plurality of maglettes each having a magnetic polarity vector; an angle between two adjacent magnetic polarity vectors in the second plurality of maglettes having a second magnitude, the first plurality of maglettes including a first outer maglette that is adjacent to a second outer maglette of the second plurality of maglettes, an angle between the magnetic polarity vectors of the first and second outer maglettes having a third magnitude that is different than at least one of the first and the second magnitudes.

Implementation of the invention may include one or more of the following features. The first and the second magnitudes of the armature are substantially the same. The armature further comprises a third magnetic structure substantially adjacent to the second magnetic structure, the third magnetic structure comprising a third plurality of maglettes each having a magnetic polarity vector, an angle between two adjacent magnetic polarity vectors in the second plurality of maglettes having a fourth magnitude. The armature further comprises a fourth magnetic structure substantially adjacent to the third magnetic structure, the third and fourth magnetic structures comprises a pair of magnetic structures. The first and the second magnetic structures of the armature comprise a first side of the armature. The armature further comprises a plurality of discrete sides, each of the plurality of discrete sides comprising at least a pair of magnetic structures. The armature is substantially cylindrical in shape and each of the first and the second magnetic structures is one of substantially disk-shaped or ring-shaped. At least two maglettes of the armature in the first and the second magnetic structures differ in dimension. At least one of the first and the second plurality of maglettes comprises two outer maglettes and two inner maglettes, a magnitude of the angles of the magnetic polarity vectors of the outer maglettes relative to a perpendicular to a direction of motion of the armature is substantially 45 degrees, and a magnitude of the angles of the magnetic polarity vectors of the inner maglettes relative to a perpendicular to a direction of motion of the armature is substantially 15 degrees. At least one of the first and the second plurality of maglettes comprises two outer maglettes and two inner maglettes, a magnitude of the angles of the magnetic polarity vectors of the outer maglettes relative to a perpendicular to a direction of motion of the armature is substantially 45 degrees, and a magnitude of the angles of the magnetic polarity vectors of the inner maglettes relative to a perpendicular to a direction of motion of the armature is substantially zero degrees. Each of the first and the second plurality of maglettes of the armature comprises three maglettes. At least one of the first and the second plurality of maglettes of the armature comprises two outer maglettes and one inner maglette, a magnitude of the angles of the magnetic polarity vectors of the outer maglettes relative to a perpendicular to a direction of motion of the armature is substantially 45 degrees, and a magnitude of the angle of the magnetic polarity vector of the inner maglette relative to a perpendicular to a direction of motion of the armature is substantially zero degrees. The first of the pair of magnetic structures of the armature forms a first magnetic field having a first magnetic polarity, the second of the pair of magnetic structures forms a second magnetic field having a second magnetic polarity, the first magnetic polarity being substantially opposite to the second magnetic polarity. At least one of the pair of magnetic structures of the armature is magnetized as a whole.

In general, in another aspect, the invention feature an armature for a linear motor which comprises at least two discrete sides, each of the at least two discrete sides comprises a first of a pair of magnetic structures comprising a first plurality of maglettes each having a magnetic polarity vector, an angle between two adjacent magnetic polarity vectors in the first plurality of maglettes having a first magnitude; and a second of the pair of magnetic structures comprising a second plurality of maglettes each having a magnetic polarity vector, an angle between two adjacent magnetic polarity vectors in the second plurality of maglettes having the second magnitude, the first plurality of maglettes including a first outer maglette that is adjacent to a second outer maglette of the second plurality of maglettes, an angle between the magnetic polarity vectors of the first and second outer maglettes having a third magnitude that is equal to both the first magnitude and the second magnitude.

Implementation of the invention may include one or more of the following features. Each one of the discrete sides of the armature further comprises a third magnetic structure substantially adjacent to the second magnetic structure, the third magnetic structure comprising a third plurality of maglettes each having a magnetic polarity vector, an angle between two adjacent magnetic polarity vectors in the second plurality of maglettes having the first magnitude. The armature further comprises a fourth magnetic structure substantially adjacent to the third magnetic structure, the third and fourth magnetic structures comprising a pair of magnetic structures. The first of the pair of magnetic structures of the armature forms a first magnetic field having a first magnetic polarity, the second of the pair of magnetic structures forms a second magnetic field having a second magnetic polarity, the first magnetic polarity being substantially opposite to the second magnetic polarity. At least one of the first and the second plurality of maglettes of the armature comprises four maglettes, the first magnitude, the second magnitude and the third magnitude of which are all substantially equal to 45 degrees. At least one of the first and the second plurality of maglettes of the armature comprises eight maglettes, the first magnitude, the second magnitude and the third magnitude of which are all substantially equal to 22.5 degrees. At least two maglettes in the first and the second magnetic structures of the armature differ in dimension. The armature is substantially cylindrical in shape and each of the first and the second magnetic structures is one of substantially disk-shaped or ring-shaped.

In general, in another aspect, the invention features a linear motor which comprises an armature comprising a first of a pair of magnetic structures comprising a first plurality of maglettes each having a magnetic polarity vector, an angle between two adjacent magnetic polarity vectors in the first plurality of maglettes having a first magnitude; and a second of the pair of magnetic structures comprising a second plurality of maglettes each having a magnetic polarity vector, an angle between two adjacent magnetic polarity vectors in the second plurality of maglettes having a second magnitude, the first plurality of maglettes including a first outer maglette that is adjacent to a second outer maglette of the second plurality of maglettes, an angle between the magnetic polarity vectors of the first and second outer maglettes having a third magnitude that is different than at least one of the first and the second magnitudes; and a stator positioned proximate to the armature

BRIEF DESCRIPTION OF THE FIGURES

This invention is described with particularity in the detailed description. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
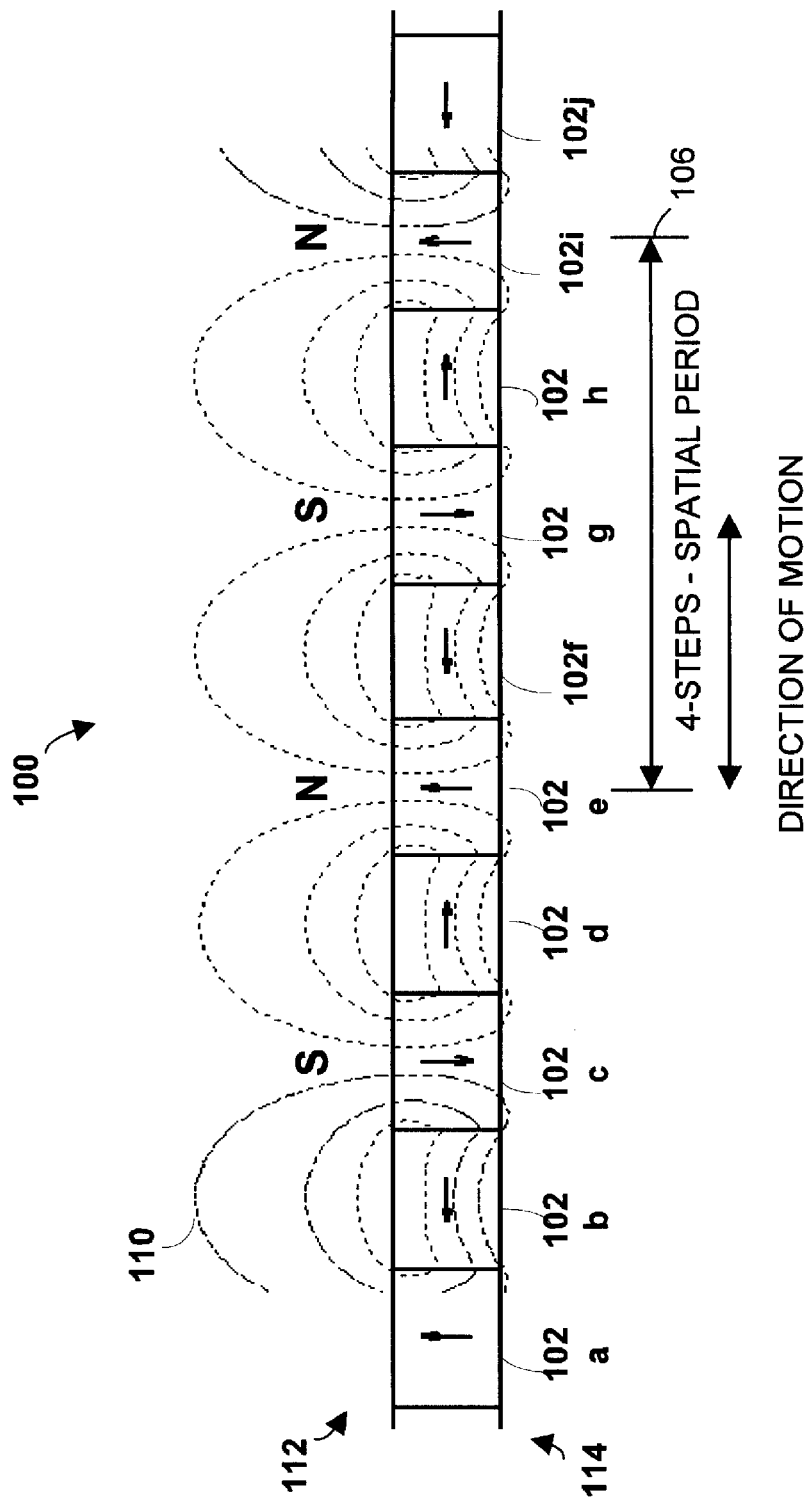
FIG. 1 illustrates a conventional 4-Step Halbach magnet array.

FIG. 1 illustrates a conventional 4-step Halbach magnet array 100. The principle of the Halbach magnet array was proposed by Klaus Halbach. The Halbach array positions permanent magnet elements in such a way that magnetic fields interfere destructively with each other in certain regions, while reinforcing each other in other regions. The Halbach magnet array 100 includes a row 102 of permanent magnets 102a-102j. The permanent magnets 102a-102j, also referred to as maglettes in this description, are oriented with alternating orthogonal magnetic polarity as illustrated by the arrows in each of the permanent magnets 102a-102j. The 4-step Halbach magnet array 100 has a spatial period 106 that is equivalent to the widths of four of the magnets 102a-102d.

The spatial period 106 is equivalent to the length of the total number of consecutive magnets in the array required to rotate the magnetic polarity vectors of the magnets by 360 degrees. The Halbach array 100 generates a magnetic flux 110 through the magnets 102a-102j without requiring iron or other magnetic material to complete the flux circuit. The magnetic flux 110 is significantly larger on the strong top side 112 of the array 100 than on the weak bottom side 114. A linear moving-magnet motor can be configured with the strong side 112 of the Halbach array 100 oriented adjacent to coils. The magnetic flux from the strong side 112 of the Halbach array 100 provides enhanced interaction with coils compared with a conventional alternating North-South magnet array.

Figure 2:
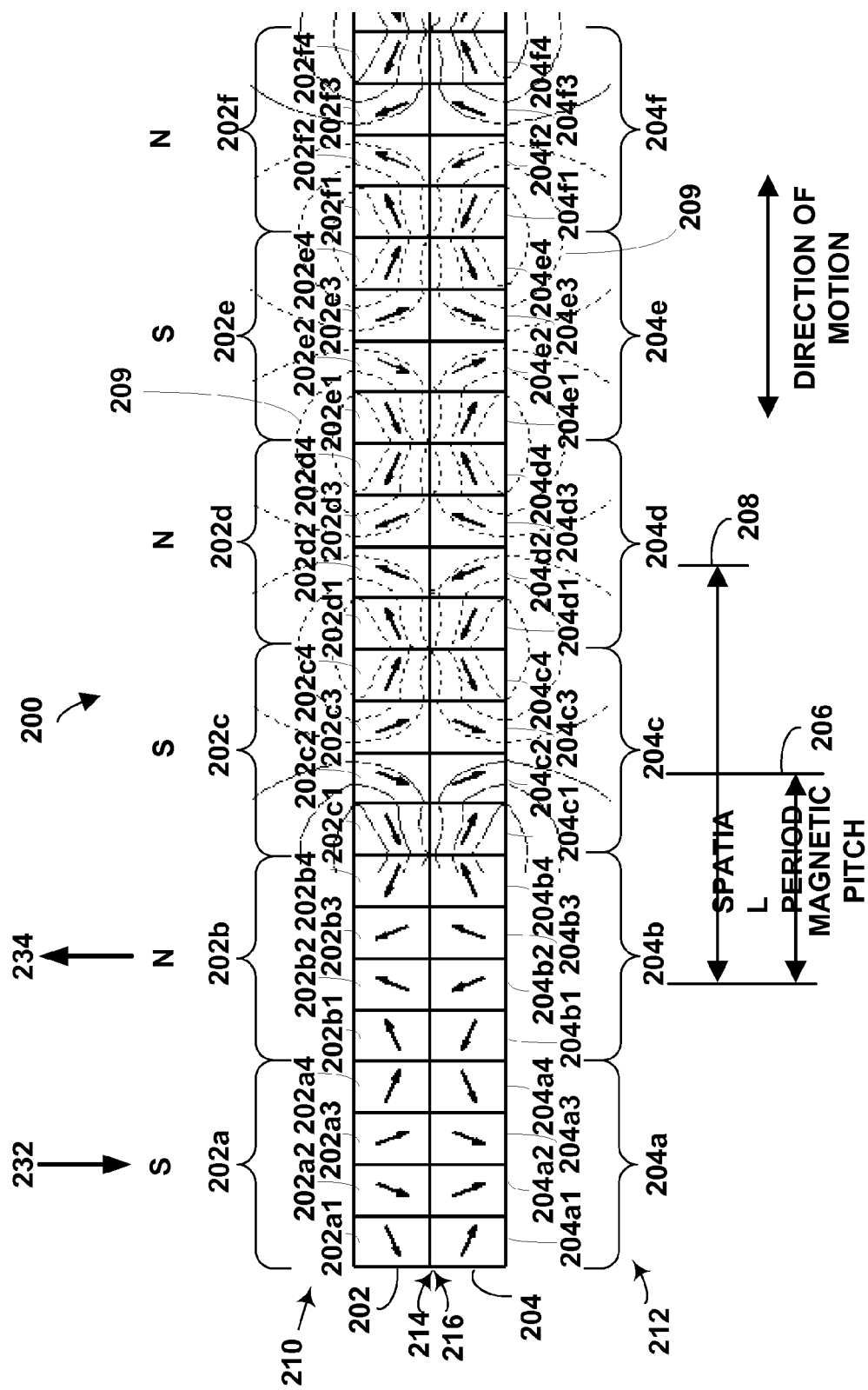
FIG. 2 illustrates an 8-step magnet array according to one embodiment.

FIG. 2 illustrates an 8-step magnet array 200 according to one embodiment. The 8-step magnet array 200 includes two rows 202, 204 of magnetic structures 202a-202f, 204a-204f. Each of the magnetic structures 202a-202f, 204a-204f includes a plurality of maglettes joined together to form a magnetic field with a magnetic polarity. In the example, magnetic structure 202a forms a magnetic field with a magnetic polarity 232, magnetic structure 202b forms a magnetic field with a magnetic polarity 234. In the example, magnetic polarity 234 is substantially opposite to the magnetic polarity 232. In the embodiment shown, each of the magnetic structures includes four maglettes 202a1-202a4, 202b1-202b4, 202c1-202c4, 202d1-202d4, 202e1-202e4, 202f1-202f4 and 204a1-204a4, 204b1-204b4, 204c1-204c4, 204d1-204d4, 204e1-204e4, 204f1-204f4 and a pair of magnetic structures includes eight maglettes corresponding to 8-steps in each row along the direction of motion. The maglettes are oriented with differing magnetic polarity as illustrated by the arrows in each of the maglettes 202a1-202a4, 202b1-202b4, 202c1-202c4, 202d1-202d4, 202e1-202e4, 202f1-202f4 and 204a1-204a4, 204b1-204b4, 204c1-204c4, 204d1-204d4, 204e1-204e4, 204f1-204f4. The magnetic polarity vector of each maglette representing the direction of magnetization of the maglette is defined with respect to an axis, such as the one perpendicular to the direction of motion. The magnetic polarity vector of each maglette can have angles having different values with different signs (+ or −). The magnetic fields generated by the maglettes (for example 202a1-202a4) in a magnetic structure (for example 202a) form a magnetic field of the magnetic structure. The polarity of the magnetic field of magnetic structure 202a is denoted as vector 232. Similarly, the polarity of the magnetic field of its adjacent magnetic structure 202b is denoted as vector 234. Polarities 232 and 234 are substantially opposite to each other. The adjacent magnetic structures thus form a pair of magnetic structures.

While the magnetic polarity of an individual maglette or a magnetic structure is defined as a vector having an angle with respect to a common axis—the axis which is perpendicular to the direction of motion in the context of this description herein, the term "intra-angle" as used herein denotes the relative angles of the magnet polarity vectors of two adjacent maglettes within each magnetic structure. For example, intra-angles are the angles between the magnet polarity vectors of maglettes 204a1 and 204a2, between the magnet polarity vectors of maglettes 204a3 and 204a4, between the magnet polarity vectors of maglettes 204b1 and 204b2, or between the magnet polarity vectors of maglettes 204b3 and 204b4. It should be noted that the magnitude of the intra-angles is described herein without regard to sign. The symbols N and S shown in FIG. 2 are illustrated for reference only and should not be construed as limiting the scope of the description. The maglettes can be individual magnets joined together to create the magnetic structures 202a-202f, 204a-204f. For example, the maglettes can be glued together using adhesive. The maglettes can also be joined together using mechanical clips, frames, or other mechanical techniques. The maglettes can include any magnetic material including ferrites or rare earth materials, such as neodymium iron boron or samarium-cobalt, for example.

The 8-step magnet array 200 includes a pair of magnetic structures (e.g. 202a and 202b), each having a magnetic pitch 206 that is equivalent to the width of four maglettes. Thus, each pair of magnetic structures includes a total of eight maglettes corresponding to a spatial period 208. As used herein, the spatial period is defined as the length of the total number of consecutive maglettes required to rotate the magnetic polarity vectors of the maglettes by 360 degrees. For example, the magnetic polarity vector of maglette 202b2 is oriented at a sixty-seven and half degree angle relative to a direction of motion. The magnetic polarity vector of maglette 202b3 is oriented at a forty-five degree angle relative to the magnetic polarity vector of maglette 202b2. The magnetic polarity vector of an adjacent maglette 202b4 is oriented at a forty-five degree angle relative to the magnetic polarity vector of maglette 202b3. The magnetic polarity vector of the next adjacent maglette 202c1 is oriented at a forty-five degree angle relative to the magnetic polarity vector of maglette 202b4. The magnetic polarity vector of the next adjacent maglette 202c2 is oriented at a forty-five degree angle relative to the magnetic polarity vector of maglette 202c1. While spatial period doesn't have to start from the first maglette of a magnetic structure, the total number of maglettes of a pair of magnetic structure does form a spatial period. The spatial period is equivalent to eight maglettes (forming a pair of magnetic structures), since it requires the magnetic polarity vectors of eight maglettes to rotate a total of 360 degrees.

The term "inter-angle" as used herein denotes the relative angles of the magnet polarity vectors between adjacent magnetic structures. For example, inter-angles are the angles between the magnet polarity vectors of maglettes 202a4 and 202b1, between the magnet polarity vectors of maglettes 202b4 and 202c1, or between the magnet polarity vectors of maglettes 202c4 and 202d1. It should be noted that the magnitude of the inter-angles is described herein without regard to sign.

In the embodiment shown in FIG. 2, the angle of each magnetic polarity vector from one maglette to the next adjacent maglette is varied in a constant manner. This includes both intra-angles between magnetic polarity vectors and inter-angles between magnetic polarity vectors. For example, the intra-angles between the magnetic polarity vectors in the maglettes 202c3-202c4 are equivalent to the inter-angles between the magnetic polarity vectors in the maglettes 202c4 and 202d1. By constant, we mean all the intra-angles and inter-angles have the same magnitudes. In the example, all angles including intra angles and inter-angles are forty-five degrees. In this embodiment, referring to row 202, the magnetic polarity vector of maglette 202a2 is oriented at forty-five degrees relative to the magnetic polarity vector of maglette 202a1. The magnetic polarity vector of maglette 202a3 is oriented at forty-five degrees relative to the magnetic polarity vector of maglette 202a2. The magnetic polarity vector of maglette 202a4 is oriented at forty-five degrees relative to the magnetic polarity vector of maglette 202a3. The magnetic polarity vector of maglette 202b1 is oriented at forty-five degrees relative to the magnetic polarity vector of maglette 202a4. The magnetic polarity vector of maglette 202b2 is oriented at forty-five degrees relative to the magnetic polarity vector of maglette 202b1. The magnetic polarity vector of maglette 202b3 is oriented at forty-five degrees relative to the magnetic polarity vector of maglette 202b2.

The magnetic polarity vector of maglette 202b4 is oriented at forty-five degrees relative to the magnetic polarity vector of maglette 202b3. The magnetic polarity vector of maglette 202c1 is oriented at forty-five degrees relative to the magnetic polarity vector of maglette 202b4.

The magnetic polarity vectors of the maglettes 202a1-202f4 within the magnetic structures 202a-202f are oriented to jointly generate a predetermined magnetization pattern 209 corresponding to a magnetic flux path. The magnetization pattern 209 is generated by varying the angles of magnetic polarity vectors in the maglettes 202a1-202f4 in a constant manner as described herein. In this embodiment, the angular orientation of the magnetic polarity vectors from one maglette to the next adjacent maglette is uniformly varied at forty-five degrees.

The magnetization pattern 209 generated by one side of the magnet array 200 of FIG. 2, and more specifically, the x and y components of the maglette residual flux density, $B_{r\_x}$ and $B_{r\_y}$, can be described by mathematical formulas:

$$B_{r\_x} = \cos(X/L - \phi)$$

$$B_{r\_y} = \sin(X/L - \phi)$$

where X is the maglette centroid x-coordinate, along the direction of motion, L is two times the magnet pitch in the x-direction, and $\phi$ is a reference angle. The maglette centroid position X is further defined as $X = (0 \ldots N-1)*2*\pi/N$, where N is the number of steps. In the case of a two-sided array, the x-component of the flux density of the bottom half is the negative of the top half. The y-components from the top half and the bottom half are the same. For a given magnetization pattern, all maglettes have the same magnitude for $B_r$ and the magnet orientation is uniformly varied from one maglette to the next adjacent maglette. Thus, the change in orientation between two adjacent maglettes in the x-direction is constant.

The magnetic flux is significantly larger on the strong outside regions 210, 212 of the array 200 than on the weak inside regions 214, 216. A linear moving-magnet motor can be configured with an armature including the magnet array 200 oriented in a channel between coils. This armature includes two sides that can assist in balancing the load on the bearings compared to a one-sided configuration. The magnetic flux from the strong sides 210, 212 of the magnet array 200 provides enhanced interaction with coils compared with the conventional Halbach array 100 of FIG. 1.

In operation, a linear motor includes coils coupled to both outside regions 210, 212 of the magnet array 200. The linear motor is energized by applying a current to the coils. The current in the coils generates a magnetic field that interacts with the magnetic field generated by the magnet array 200. This interaction causes the magnetic array 200 to move relative to the coils.

Figure 3:
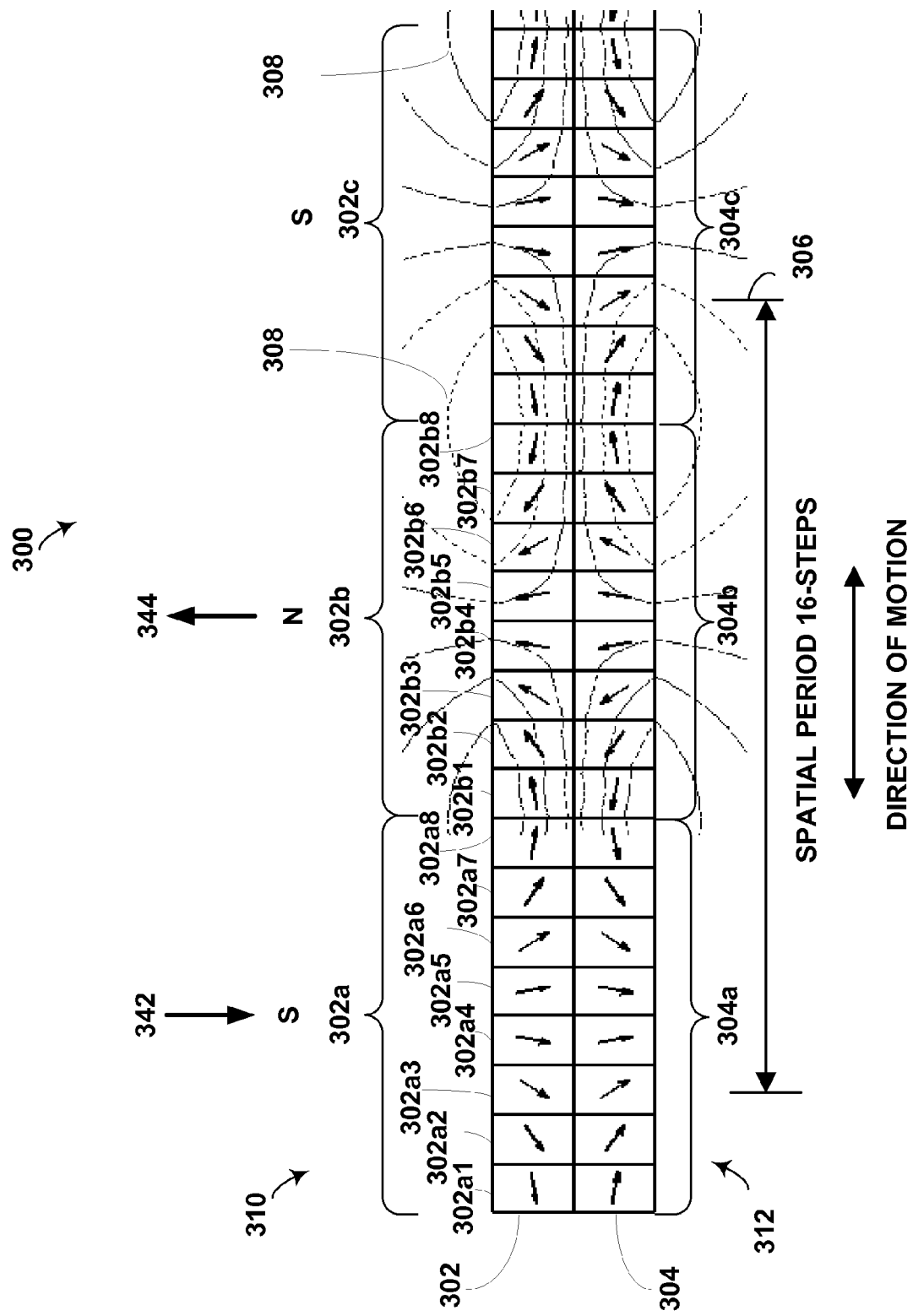
FIG. 3 illustrates a 16-step magnet array according to one embodiment.

FIG. 3 illustrates a 16-step two-sided magnet array 300 according to one embodiment. The 16-step magnet array 300 includes two rows 302, 304 of magnetic structures 302a-302c, 304a-304c. Each of the magnetic structures 302a-302c, 304a-304c includes a plurality of maglettes that are oriented with differing magnetic polarity as illustrated by the arrows in each of the maglettes. For clarity, the pluralities of maglettes for only the first two magnetic structures 302a, 302b are called-out in FIG. 3. Polarities 342 and 344 of the magnetic fields of a pair of two adjacent magnetic structures 302a and 302b, wherein the polarities 342 and 344 are substantially opposite to each other. The symbols N and S are illustrated for reference only and should not be construed as limiting the scope of the description.

The 16-step magnet array 300 includes a pair of magnetic structures (e.g. 302a and 302b), each having a magnetic pitch that is equivalent to the width of eight maglettes. Thus, each pair of magnetic structures includes, in each row along the direction of motion, a total of sixteen maglettes corresponding to a spatial period 306. The spatial period 306 corresponds to the total number of adjacent maglettes required to rotate the magnetic polarity vectors of the maglettes by 360 degrees.

The pluralities of maglettes from the magnetic structures 302a-302c, 304a-304c are oriented to generate a predetermined magnetization pattern 308 corresponding to a magnetic flux path. The magnetization pattern 308 is generated by varying the inter-angles and intra-angles of magnetic polarity vectors in each plurality of maglettes in a constant manner.

The angular orientation of the magnetic polarity vectors from one maglette to the next adjacent maglette is uniformly varied. For example, referring to row 302, the magnetic polarity vector of maglette 302a2 is oriented at 22.5 degrees relative to the magnetic polarity vector of maglette 302a1. The magnetic polarity vector of maglette 302a3 is oriented at 22.5 degrees relative to the magnetic polarity vector of maglette 302a2. The magnetic polarity vector of maglette 302a4 is oriented at 22.5 degrees relative to the magnetic polarity vector of maglette 302a3. The magnetic polarity vector of maglette 302a5 is oriented at 22.5 degrees relative to the magnetic polarity vector of maglette 302a4. The magnetic polarity vector of maglette 302a6 is oriented at 22.5 degrees relative to the magnetic polarity vector of maglette 302a5. The magnetic polarity vector of maglette 302a7 is oriented at 22.5 degrees relative to the magnetic polarity vector of maglette 302a6. The magnetic polarity vector of maglette 302a8 is oriented at 22.5 degrees relative to the magnetic polarity vector of maglette 302a7. The magnetic polarity vector of maglette 302b1 is oriented at 22.5 degrees relative to the magnetic polarity vector of maglette 302a8.

A linear moving-magnet motor can be configured with an armature including the magnet array 300 oriented in a channel between coils. The coils are coupled to both outside regions 310, 312 of the magnet array 300.

Figure 4:
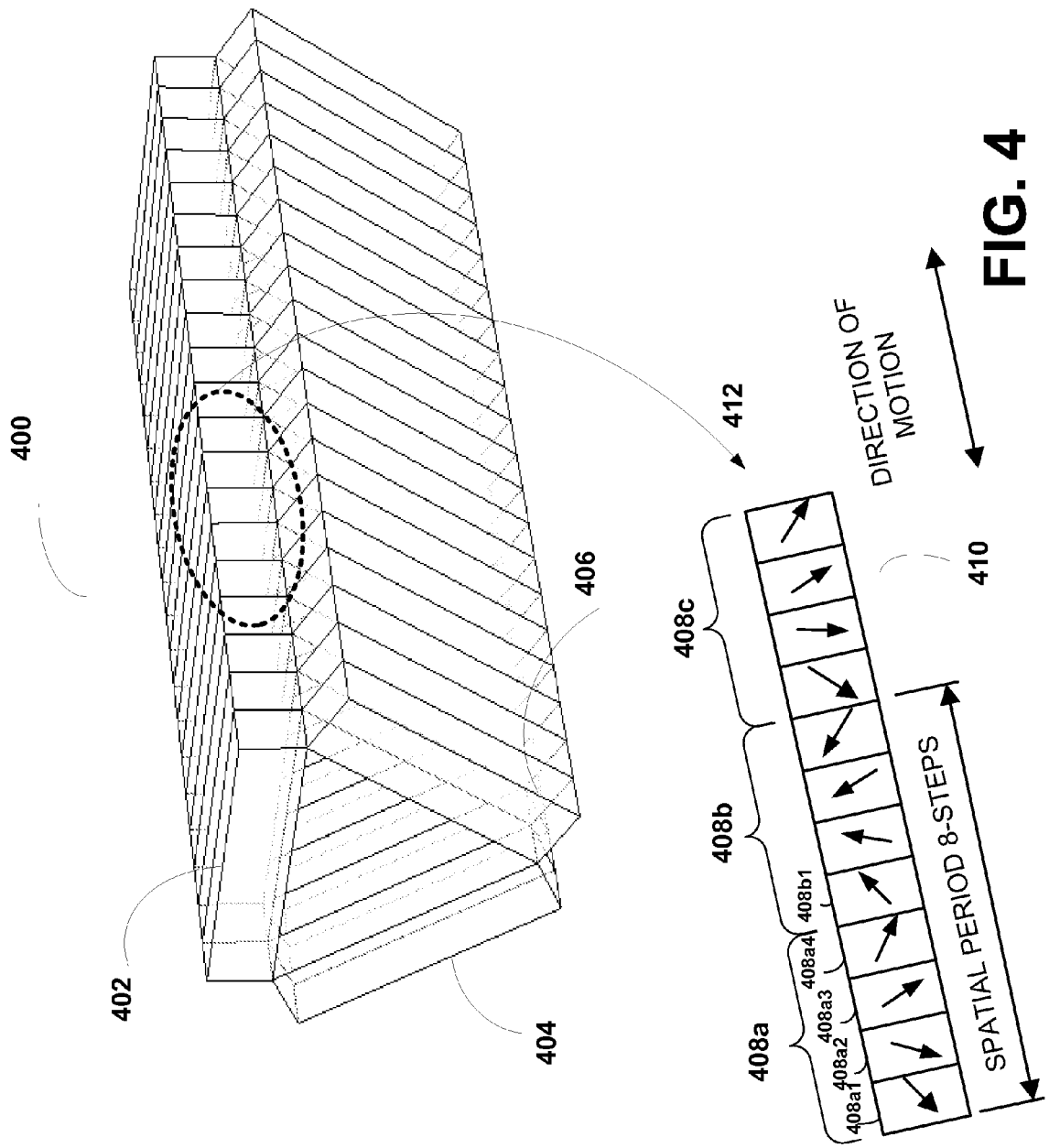
FIG. 4 is a perspective view of a magnet array according to one embodiment.

FIG. 4 is a perspective view of a magnet array 400 according to one embodiment. The magnet array 400 includes three discrete sides 402, 404, 406. The discrete sides 402, 404, 406 are positioned such that a cross section is triangular in shape. In one embodiment, the triangle is an equilateral triangle. Each discrete side 402, 404, 406 includes a row of magnetic structures. As shown in side view 412, a row of magnetic structures 410 comprises magnetic structures 408a-408c, each magnetic structure includes a plurality of maglettes. The spatial period is equivalent to the length of the total number of consecutive maglettes in a particular discrete side 402, 404, 406 required to rotate the magnetic polarity vectors of the maglettes by 360 degrees. In this embodiment, the spatial period is equivalent to the length of a pair of magnetic structures (e.g., 408a, 408b) including eight maglettes corresponding to 8-steps in the direction of motion. The maglettes are oriented with differing magnetic polarity as illustrated by the arrows in each of the maglettes.

Each of the plurality of magnetic structures 408a-408c is substantially adjacent to each other. Each of the pluralities of maglettes is oriented to generate a predetermined magnetization pattern. The magnetization pattern is generated by varying the angles of magnetic polarity vectors in the plurality of maglettes in each magnetic structure in a constant manner. In the example, the magnetic polarity vector of each maglette is oriented at forty-five degrees relative to an adjacent maglette in each magnetic structure. The magnetic polarity vector of maglette 408a1 is oriented at a twenty-two and half degree angle relative to a direction of motion. The magnetic polarity vector of maglette 408a2 is oriented at a forty-five degree angle relative to the magnetic polarity vector of maglette 408a1. The magnetic polarity vector of maglette 408a3 is oriented at a forty-five degree angle relative to the magnetic polarity vector of maglette 408a2. The magnetic polarity vector of maglette 408a4 is oriented at a forty-five degree angle relative to the magnetic polarity vector of maglette 408a3. The magnetic polarity vector of maglette 408b1 is oriented at a forty-five degree angle relative to the magnetic polarity vector of maglette 408a4. It should be noted that the magnitude of the change in angles of the magnetic polarity vectors is described herein without regard to sign while the magnetic polarity vectors of the maglettes, which are defined with respect to an axis, such as the one perpendicular to the direction of motion, can have angles having different values with different signs (+ or –).

The magnet array 400 can form an armature of a linear motor. A stator (not shown) having a plurality of coils can surround a portion of the magnet array 400.

Figure 5:
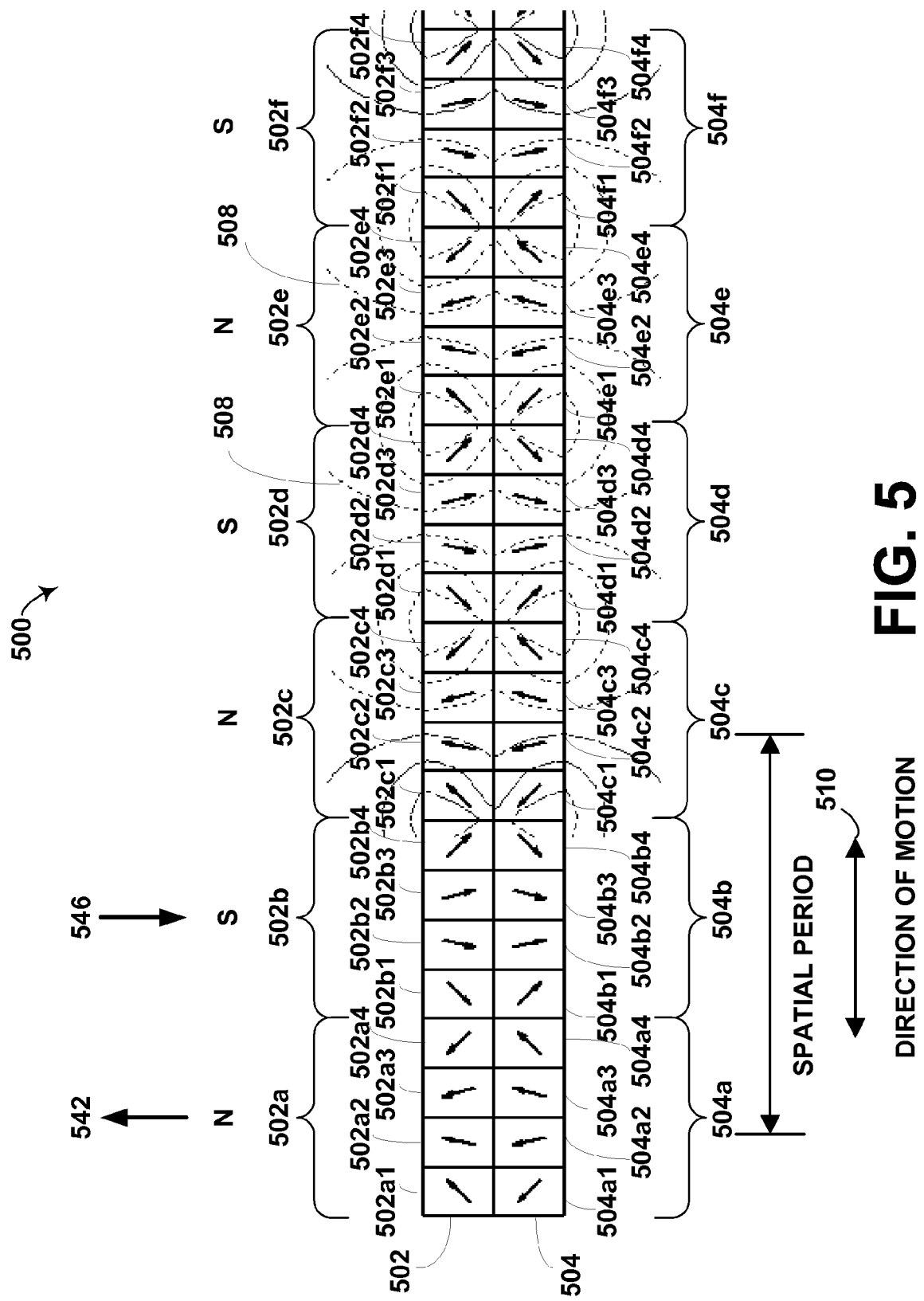
FIG. 5 illustrates an 8-step magnet array according to one embodiment.

FIG. 5 illustrates an 8-step two-sided magnet array 500 according to one embodiment. The 8-step magnet array 500 includes two rows 502, 504 of magnetic structures 502a-502f, 504a-504f. Each of the magnetic structures 502a-502f, 504a-504f includes four maglettes 502a1-502a4, 502b1-502b4, 502c1-502c4, 502d1-502d4, 502e1-502e4, 502f1-502f4 and 504a1-504a4, 504b1-504b4, 504c1-504c4, 504d1-504d4, 504e1-504e4, 504f1-504f4 that are oriented with differing magnetic polarity as illustrated by the arrows in each of the maglettes. A pair of magnetic structures (e.g., 502a, 502b or 504a, 504b) includes eight maglettes in each row along the direction of motion which is the length of the number of adjacent maglettes required to rotate the magnetic polarity vectors of the maglettes by 360 degrees (i.e., the spatial period).

Each of the plurality of magnetic structures 502a-502f, 504a-504f is substantially adjacent to each other. Each of the pluralities of maglettes is oriented to jointly generate a predetermined magnetization pattern 508, which is represented as the polarities 542 and 546 of the magnetic fields of the magnetic structures 502a and 502b. The magnetization pattern 508 is generated by varying the intra-angles and/or inter-angles of magnetic polarity vectors in the plurality of maglettes in each magnetic structure in a non-constant manner. By non-constant, we mean that the not all intra-angles and inter-angles have the same magnitudes. The magnetization patterns 508 of the adjacent magnetic structures are substantially opposite in direction.

For example, referring to row 502, the magnetic polarity vector of maglette 502a1 is oriented at forty-five degrees relative to the direction of motion of the armature. The magnetic polarity vector of maglette 502a2 is oriented at a direction thirty degrees relative to the polarity vector of maglette 502a1. The magnetic polarity vector of maglette 502a3 is oriented at a direction thirty degrees relative to the polarity vector of maglette 502a2. The magnetic polarity vector of maglette 502a4 is oriented at a direction thirty degrees relative to the polarity vector of maglette 502a3. The magnetic polarity vector of maglette 502b1 is oriented at a direction ninety degrees relative to the polarity vector of maglette 502a4. It should be noted that the magnitude of the change in angles of the magnetic polarity vectors relative to the polarity vector of its adjacent maglette is described herein without regard to sign. In this embodiment, the thirty degrees relative angle change between polarity vectors of the two adjacent maglettes in each magnetic structure repeats for each of the plurality of magnetic structures 502a-502f, 504a-504f in the armature. Other magnitude values of the relative angle change can also be used. For example, in another 8-step embodiment, the relative angle change is fifteen degrees within each magnetic structure and repeats for each of the plurality of magnetic structures 502a-502f, 504a-504f in the armature. In other embodiments, the inter-angles can vary between about 45° and 90° and the intra-angles can vary between about 45° and 30°.

In one embodiment, the angular pattern prescribed by the relative angle change can also vary between magnetic structures 502a-502f, 504a-504f. For example, the angular pattern for magnetic structures 502a-502f can be different than the angular pattern for magnetic structures 504a-504f.

The inter-angles of the magnet polarity vectors of maglettes (e.g., 502a4 and 502b1) in adjacent magnetic structures (e.g., 502a and 502b) can be the same throughout the magnetic array 500. In this embodiment, a magnitude of the inter-angles of the magnet polarity vectors (for example, relative angle between 502a4 and 502b1) is ninety degrees. Other values can also be used depending on the desired magnetization pattern.

Although two rows of magnetic structures 502, 504 are shown in FIG. 5, the principles discussed can be applied to an array having other number of rows such as a single row or a three-row of magnetic structures (not shown). The single row of magnetic structures can form a single-sided armature for a linear motor and a three-row of magnetic structures can form a three-sided armature for a linear motor. A stator (not shown) having coils can be positioned adjacent to the single-sided armature, such as adjacent to the strong side of the armature.

Figure 6:
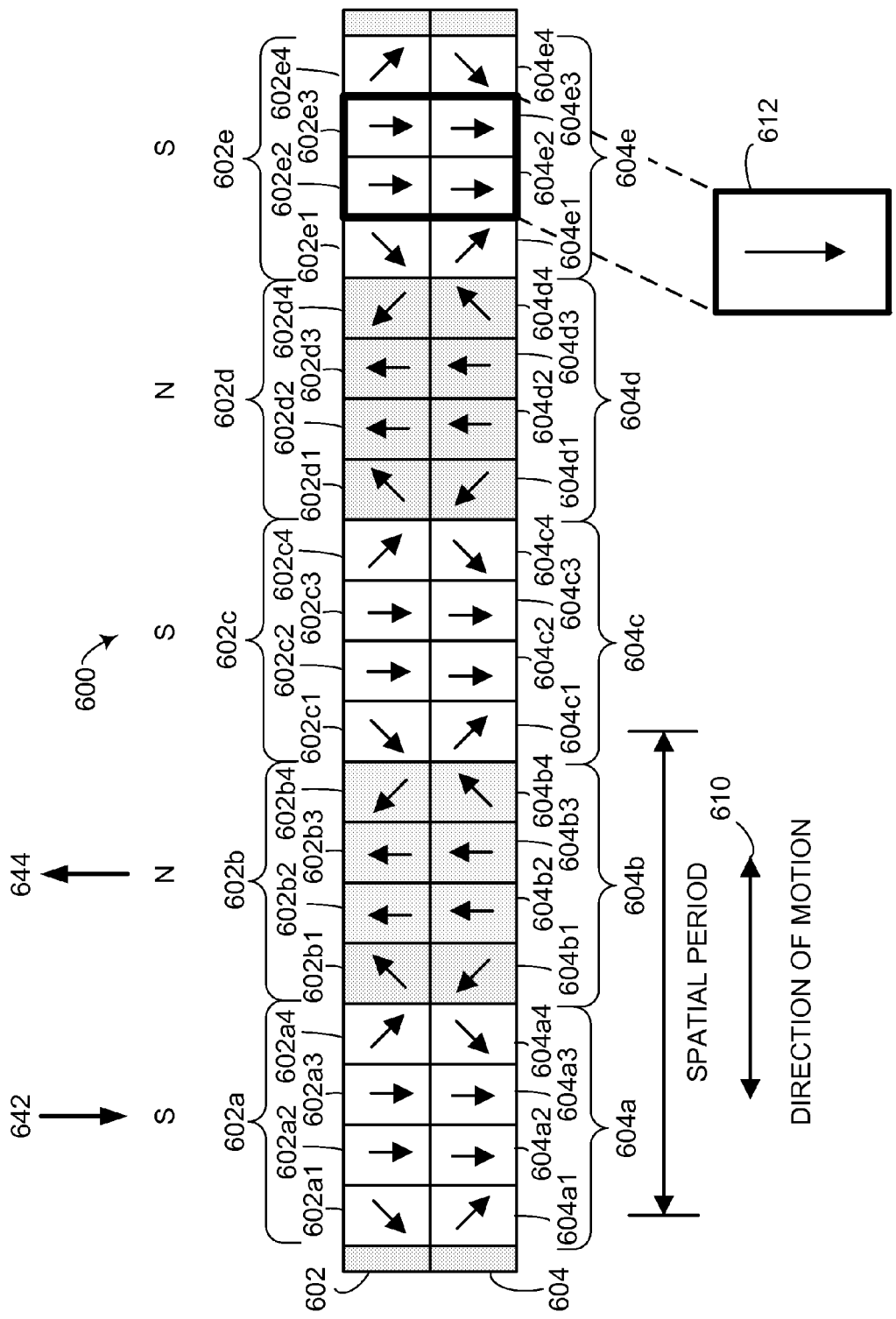
FIG. 6 illustrates an 8-step magnet array according to one embodiment.

FIG. 6 illustrates an 8-step two-sided magnet array 600 according to one embodiment. The 8-step magnet array 600 includes two rows 602, 604 of magnetic structures 602a-602e, 604a-604e. Each of the magnetic structures 602a-602e, 604a-604e includes a plurality of maglettes 602a1-602a4, 602b1-602b4, 602c1-602c4, 602d1-602d4, 602e1-602e4, and 604a1-604a4, 604b1-604b4, 604c1-604c4, 604d1-604d4, 604e1-604e4 that are oriented with differing magnetic polarity as illustrated by the arrows in each of the maglettes 602a1-602a4, 602b1-602b4, 602c1-602c4, 602d1-602d4, 602e1-602e4, and 604a1-604a4, 604b1-604b4, 604c1-604c4, 604d1-604d4, 604e1-604e4.

Each of the plurality of magnetic structures 602a-602e, 604a-604e is substantially adjacent to each other. Each of the pluralities of maglettes is oriented to generate a predetermined magnetization pattern. As shown in FIG. 6, the predetermined magnetization pattern results in the polarity vectors 642 and 644 of the magnetic fields of the two adjacent magnetic structures 602a and 602b. The magnetization pattern is generated by varying the intra-angles and/or inter-angles of magnetic polarity vectors in the plurality of maglettes in each magnetic structure 602a-602e, 604a-604e in a non-constant manner. In other words, not all intra-angles and inter-angles are the same.

Referring to row 602, the magnetic polarity vector of maglette 602a1 is oriented at forty-five degrees relative to a perpendicular to the direction of motion 610 of the armature. The magnetic polarity vector of maglette 602a2 is oriented at a direction forty-five degrees relative to the polarity vector of maglette 602a1. The magnetic polarity vector of maglette 602a3 is oriented at a direction zero degree relative to the polarity vector of maglette 602a2. The magnetic polarity vector of maglette 602a4 is oriented at a direction forty-five degrees relative to the polarity vector of maglette 602a3. In this embodiment, the angular pattern defined as relative angle change between two adjacent maglettes 45°-0°-0°-45° repeats for each of the plurality of magnetic structures 602a-602e, 604a-604e in the armature. Other angular patterns having different values can also be used.

In the embodiment shown, each two-row magnetic structure 602a-602e, 604a-604e includes a total of eight maglettes. In another embodiment, the four inside maglettes (e.g., 602e2, 602e3, 604e2, 604e3) can be replaced by a single maglette 612 in each of the magnetic structures 602a-602e, 604a-604e. This is possible because the magnetic polarity vectors of the inside maglettes 602e2, 602e3 and 604e2, 604e3 have the same orientation. The single maglette 612 can have different dimensions (e.g., the length of each side could be two times larger, leading the a maglette with four times the volume) than each of the outer maglettes 602e1, 602e4 and 604e1, 604e4. In other embodiments, at least two maglettes in each of the magnetic structures 602a-602e, 604a-604e differ in at least one dimension. For the embodiments described herein, it should be noted that the dimensions of the maglettes can be varied within the magnet arrays.

Figure 7:
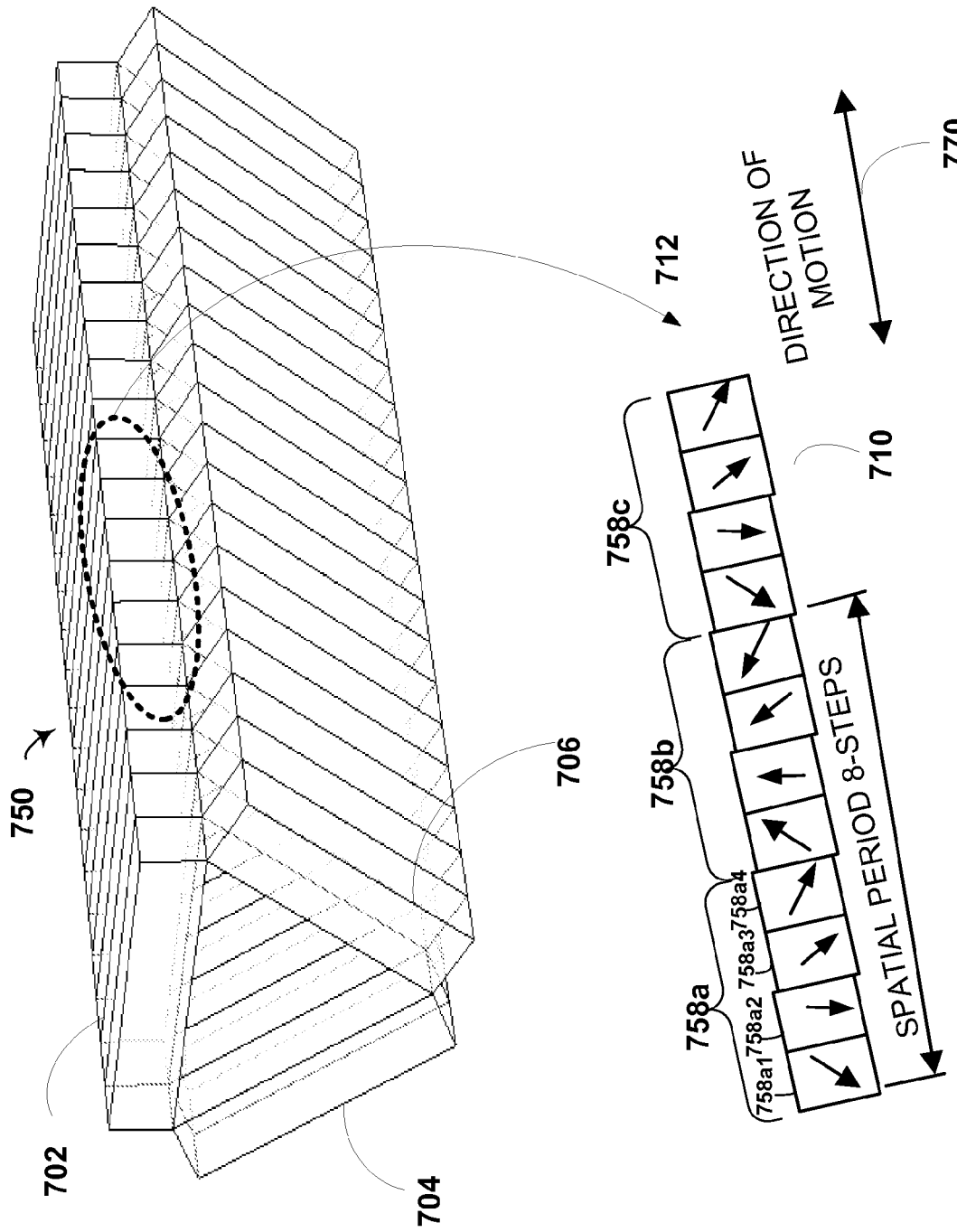
FIG. 7 is a perspective view of a magnet array according to one embodiment.

FIG. 7 is a perspective view of a magnet array 750 according to one embodiment. The magnet array 750 includes three discrete sides 702, 704, 706. The discrete sides 702, 704, 706 are positioned such that the cross section is triangular in shape. In one embodiment, the triangle is an equilateral triangle. Each discrete side 702, 704, 706 includes a row of magnetic structures. As shown in side view 712, a row of magnetic structures 710 comprises magnetic structures 758a-758c, each magnetic structure includes a plurality of maglettes. A pair of magnetic structures (e.g., 758a, 758b) in a particular discrete side 702, 704, 706 includes eight maglettes corresponding to 8-steps in each row along the direction of motion that is the length of the number of adjacent maglettes required to rotate the magnetic polarity vectors of the maglettes by 360 degrees (i.e., the spatial period). The maglettes are oriented with differing magnetic polarity as illustrated by the arrows in each of the maglettes.

Each of the plurality of magnetic structures 758a-758c is substantially adjacent to each other. Each of the pluralities of maglettes is oriented to generate a predetermined magnetization pattern. The magnetization pattern is generated by varying the intra-angles and/or inter-angles of magnetic polarity vectors in the plurality of maglettes in each magnetic structure in a non-constant manner. For example, referring to row 710, the magnetic polarity vector of a first maglette 758a1 in the magnetic structure 758a is oriented at forty-five degrees relative to the direction of motion 770. The magnetic polarity vector of the second adjacent maglette 758a2 in the magnetic structure 758a is oriented at a direction thirty degrees relative to the polarity vector of the first maglette 758a1. The magnetic polarity vector of the third next adjacent maglette 758a3 is oriented at a direction thirty degrees relative to the polarity vector of the second maglette 758a2. The magnetic polarity vector of the next fourth adjacent maglette 758a4 is oriented at a direction thirty degrees relative to the polarity vector of the third maglette 758a3. It should be noted that the magnitude of the change in angles of the magnetic polarity vectors is described herein without regard to sign. In this embodiment, the angular pattern with constant fifteen degrees relative angle change between two adjacent maglettes within a magnetic structure (for example, 758a) repeats for each of the plurality of magnetic structures 758a-758c. Other angular patterns having different values can also be used.

The magnet array 750 having the triangular cross-sectional area can form an armature of a linear motor. A stator (not shown) having a plurality of coils can surround a portion of the magnet array 750.

Figure 8:
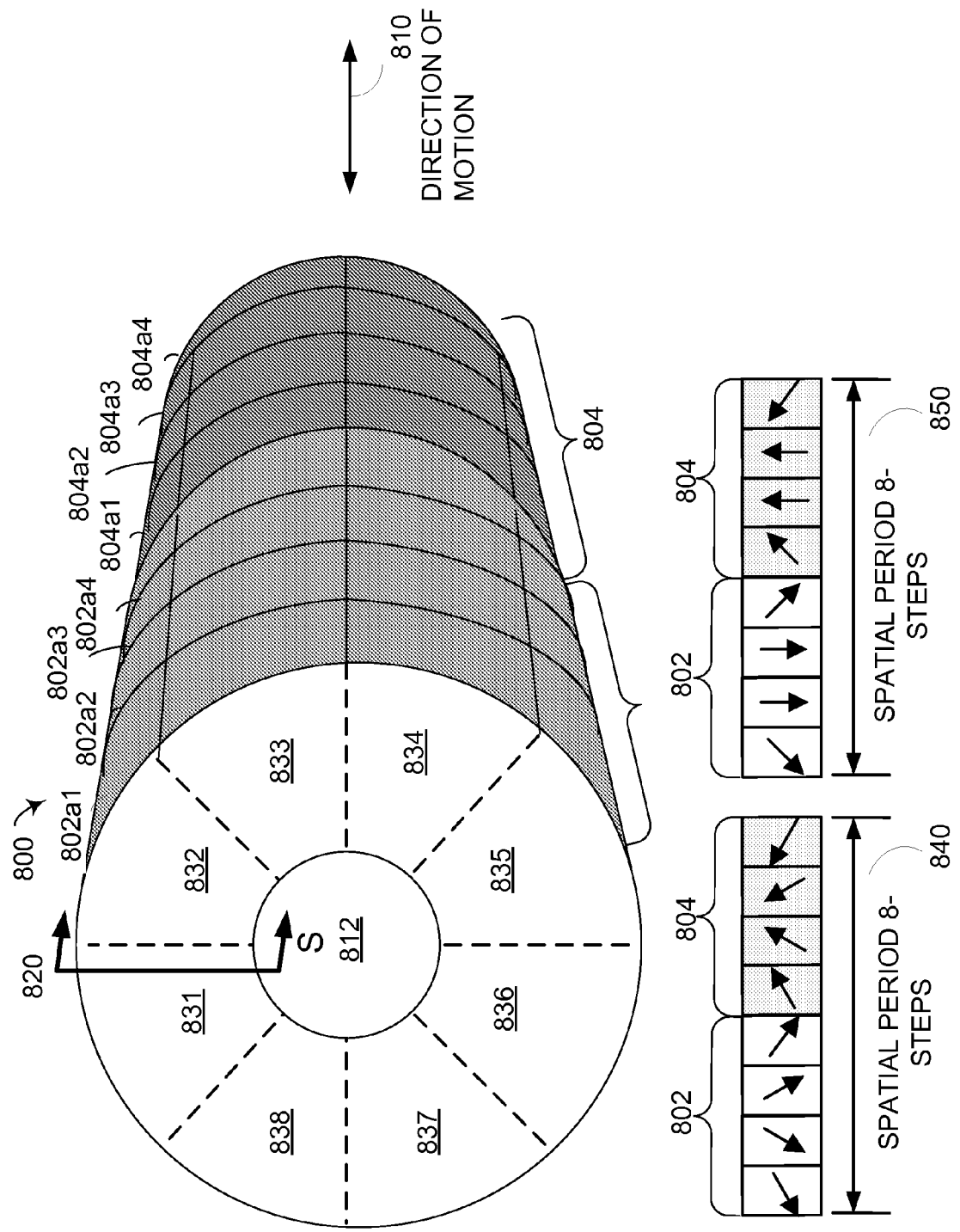
FIG. 8 illustrates a cylindrical 8-step magnet array according to one embodiment.

FIG. 8 is a perspective view of a magnet array 800 according to one embodiment. The magnet array 800 is substantially cylindrical in shape and includes two magnetic structures 802, 804 for illustration. In practice, a cylindrical magnet array may include more than two magnet arrays. The cylindrical magnet array 800 can form an armature of a linear motor. The cylindrical magnet array 800 can be formed, in circumferential direction, in a single piece or multiple pieces such as 831-838. The multiple pieces 831-738 form a ring or a disk when they are joined together.

Each of the magnetic structures 802, 804 includes a plurality of maglettes. For example, the first magnet structure 802 includes maglettes 802a1-802a4, and the second magnetic structure 804 includes maglettes 804a1-804a4.

As seen from cross-sections 820, a row of magnetic structures 840 comprises magnetic structures 802 and 804. In one embodiment, the intra-angles and inter-angles of the magnetic polarity vectors of the maglettes in each cross-section (for example 820) are varied in a constant manner (840). In another embodiment, the intra-angles and inter-angles of the magnetic polarity vectors of the maglettes in each cross-section (for example 820) are varied in a non-constant manner (850). A stator (not shown) having a plurality of coils can surround a portion of the magnet array 800.

Figure 9:
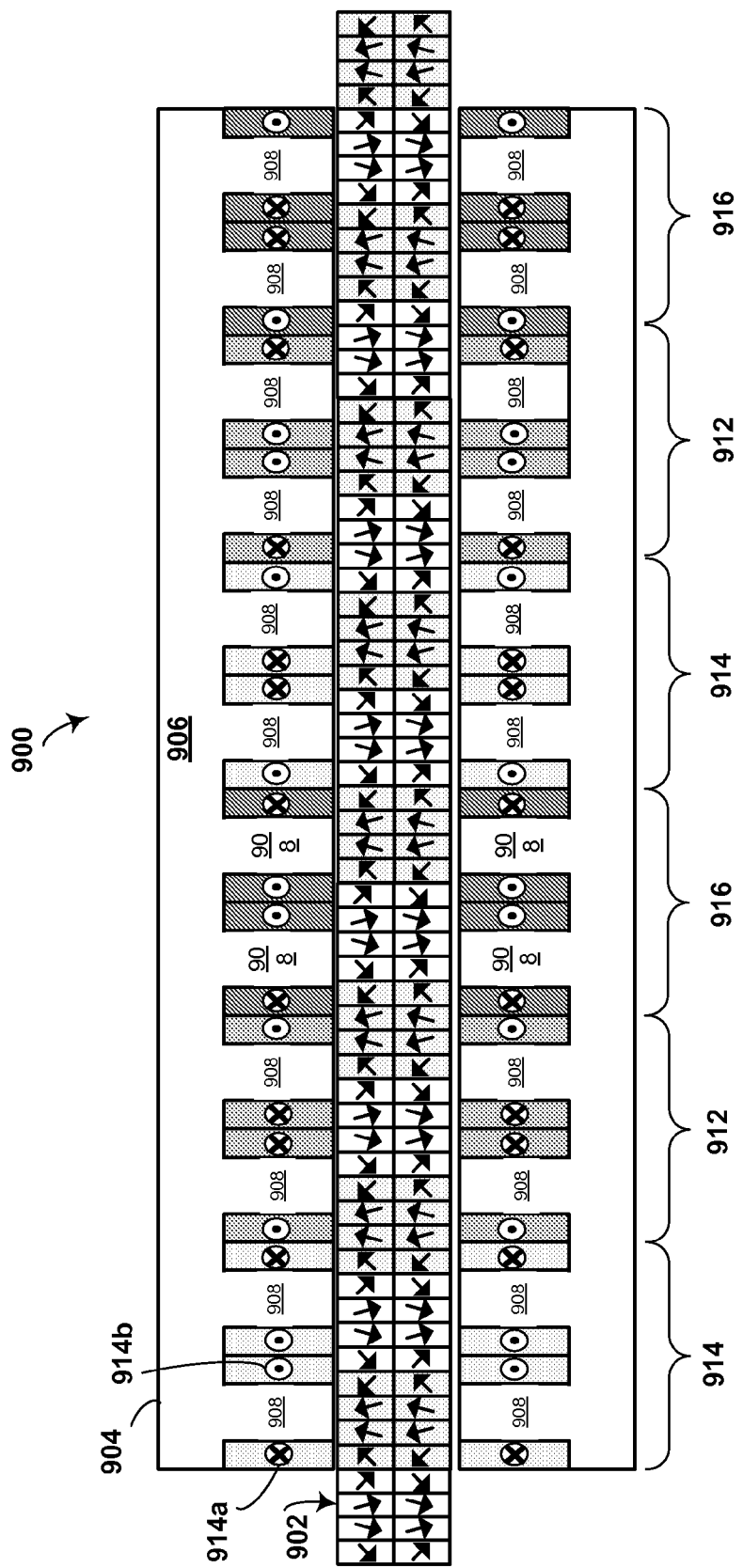
FIG. 9 illustrates a linear motor according to one embodiment.

FIG. 9 illustrates a linear motor 900 according to one embodiment. The linear motor 900 includes an armature 902 including a magnet array. The linear motor 900 also includes a stator 904. The stator 904 can include a core 906 having a plurality of teeth 908. In one embodiment, the stator 904 is formed with magnetic steel laminations. One or more of the teeth 908 can include a coil wound thereon. In this embodiment, the stator 904 includes two sides. Any suitable number of magnetic structures and stator coils can be used in practice.

Techniques for controlling the current in a linear motor 900 are generally known. For example, in a multiphase motor such as disclosed herein, the coil assembly in the stator 904 has various windings that are grouped into phases 914, 912, 916. The phase groups 914, 912, 916 are selectively energized with electric current to increase the efficiency of the linear motor 800. Typically, the armature 902 rides on low friction bearings (not shown) mechanically coupled between the armature 902 and the stator 904.

The following description will focus on one side of the linear motor 900. However, the principles described apply to the second side of the linear motor 900, as well as other linear motors having more than two discrete sides or linear motors having continuous cylindrical configurations. The first group of coils 914 is energized causing the armature 902 to move relative to the stator 904. For example, the armature 902 moves out of its initial position as the magnetic flux from the magnetic structures interact with the magnetic flux generated by the first phase group 914. Next, the second phase group 912 is energized. The third phase group 916 is then energized. Additional phase groups (not shown) are theoretically more efficient since a more even application of force and utilization of power input is maintained in the motor. However, each additional phase group complicates the timing of the pulses to the various phase groups. Three-phase motors tend to be used when balancing these tradeoffs.

As previously described, the linear motor 900 includes three phases of conductor windings. The three phase groups (914, 912, 916) in FIG. 9 represent cross-sections of conductor windings of the coils as they are arranged in the stator 904. Accordingly, the three different phase groups (914, 912, 916) can be selectively energized to create efficient movement of the armature 902 relative to the stator 904.

Each coil in the same phase group carries the same instantaneous current. Thus, for phase group 914, electric current flows into the plane of FIG. 9 at coil 914a and since the coil is in the form of a continuous loop, electric current flows out of the plane of FIG. 9 at coil 914b.

The linear motor 900 can be controlled by commutation circuits and current sources (not shown) that are coupled to a conventional motor control module (not shown), which provides logic signals for directing the operation of linear motor 900. Connecting leads between motor coils and their corresponding commutation circuits and current sources each include a multiplicity of electric wires, distributing current selectively through the individual coil phases.

Figure 10:
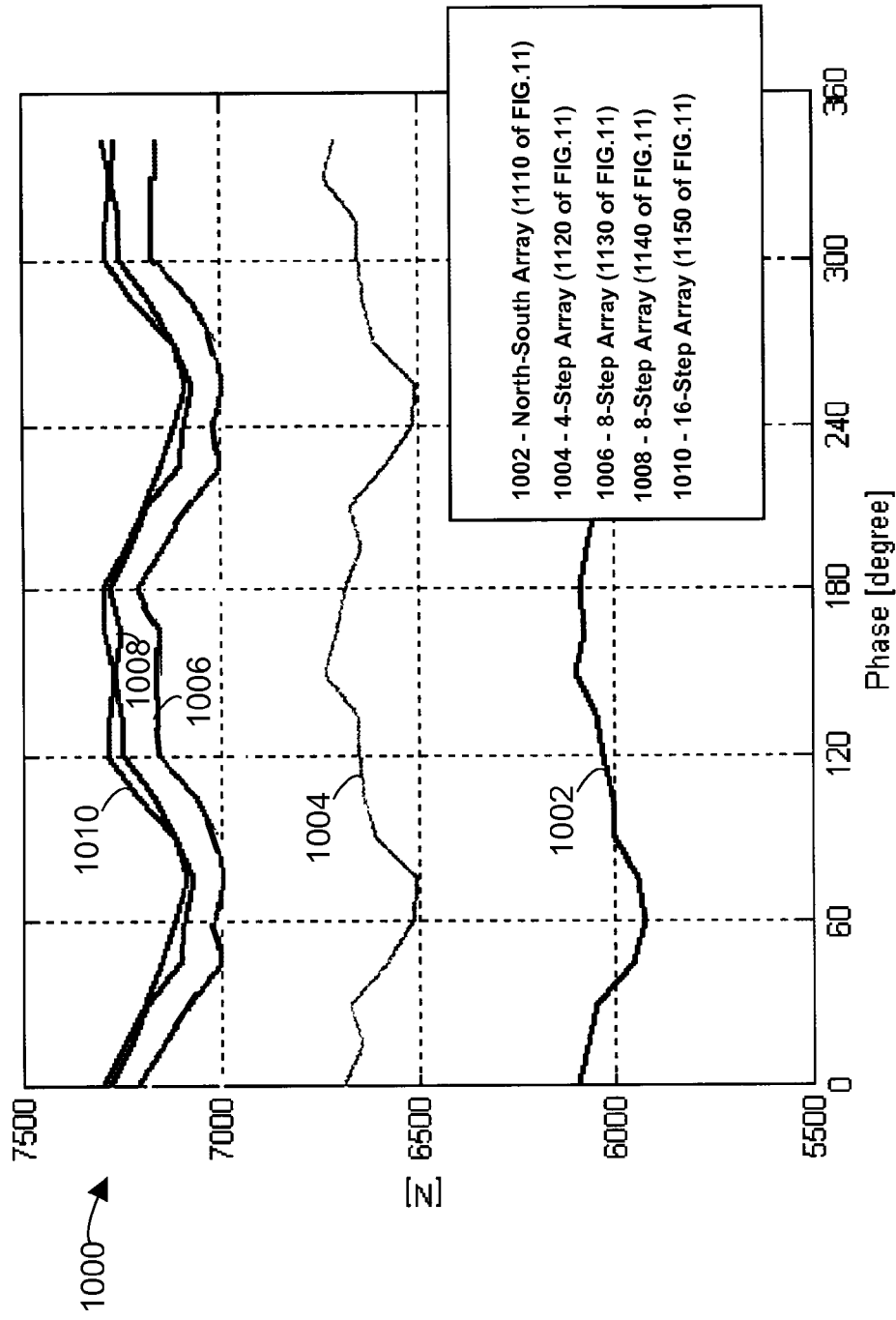
FIG. 10 graphically illustrates the productive force of various illustrative magnet arrays compared with a traditional north-south array and a 4-step Halbach array of FIG. 1.
Figure 11:
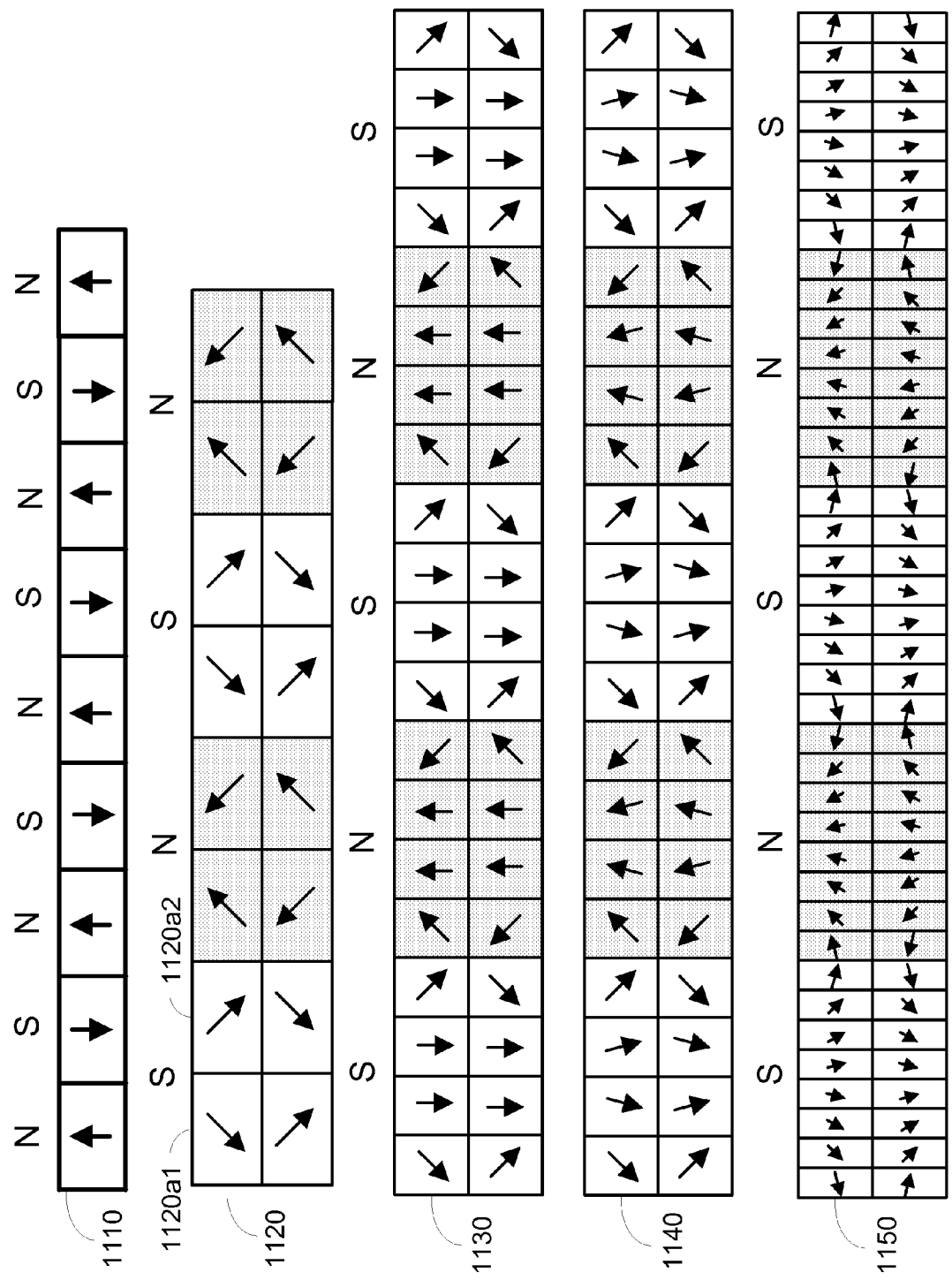
FIG. 11 illustrates various magnet arrays in connection with productive force comparison in FIG. 10.

FIG. 10 is a graph 1000 of the productive force of various illustrative magnet arrays in FIG. 11. The productive force associated with the traditional North-South array (1110 of FIG. 11) is shown by line 1002. The productive force associated with a 4-step double-sided Halbach array (1120 of FIG. 11) is shown by line 1004. As shown in FIG. 11, the relative angle changes between two adjacent maglettes of both the intra-angles and inter-angles are constant. Specifically, the relative angle changes are constant at ninety degrees between any of the two adjacent maglettes such as 1120a1 and 1120a2. The productive force associated with a 8-step double-sided magnet array (1130 of FIG. 11) is shown by line 1006. Magnet array 1130 of FIG. 11 is the same magnet array as FIG. 6. As described in connection with FIG. 6, Magnet array 1130 has a non-constant angular change pattern. The productive force associated with another 8-step double-sided magnet array (1140 of FIG. 11) is shown by line 1008. Magnet array 1140 of FIG. 11 is the same magnet array as FIG. 5. As described in connection with FIG. 5, magnet array 1140 also has a non-constant angular change pattern which is different from that of FIG. 6. The productive force associated with a 16-step double-sided magnet array (1150 of FIG. 11) is shown by line 1010. Magnet array 1150 of FIG. 11 is the same magnet array as FIG. 3. As described in connection with FIG. 3, magnet array 1150 has a constant angular change pattern. Specifically, the relative angle changes are constant at 12.25 degrees between any of the two adjacent maglettes.

The productive force of the illustrative magnet arrays 200, 400, 500 is greater than the productive force of the traditional North-South array and the 4-step Halbach array 100. For a given magnet volume, the increase in productive force increases the efficiency of a linear motor compared with a traditional North-South magnet array or a 4-step Halbach magnet array.

In some embodiments, it is possible to assemble the maglettes corresponding to a magnetic structure in a magnet array prior to magnetizing the maglettes. This is opposed to magnetizing the maglettes and then assembling the magnetic structure. Assembling the magnetic structures when the maglettes are magnetized can be undesirable because inter-maglette magnetic forces can make assembly difficult.

The foregoing description is intended to be merely illustrative of the present invention and should not be construed as limiting the appended claims to any particular embodiment or group of embodiments. Thus, while the present invention has been described with reference to exemplary embodiments, it should also be appreciated that numerous modifications and alternative embodiments may be devised by those having ordinary skill in the art without departing from the broader and intended spirit and scope of the present invention as set forth in the claims that follow. In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed devices or portions thereof may be combined together or separated into further portions unless specifically stated otherwise; and f) no specific sequence of acts or steps is intended to be required unless specifically indicated.

What is claimed is:

1. An armature for a motor, the armature comprising:
a first and second magnetic structure forming a first spatial period of the armature;
(i) wherein the first magnetic structure has a first magnetic polarity and includes a first plurality of maglettes, the first plurality of maglettes comprising:
at least two outer maglettes and at least two inner maglettes, wherein at least two maglettes of the first plurality of maglettes are arranged adjacent to one another, each maglette of the first plurality of maglettes has associated therewith a magnetic polarity vector and wherein an angle between the magnetic polarity vectors of each pair of maglettes that are adjacent to one another within the first plurality of maglettes has a first angle magnitude between about 45 degrees and 30 degrees;
(ii) wherein the second magnetic structure is adjacent the first magnetic structure and has a second magnetic polarity that is different from the first magnetic polarity, the second magnetic structure comprising a second plurality of maglettes comprising:
at least two outer maglettes and at least two inner maglettes, wherein at least two maglettes of the second plurality of maglettes are arranged adjacent to one another, each maglette of the second plurality of maglettes has associated therewith a magnetic polarity vector, wherein an angle between the magnetic polarity vectors of each pair of maglettes that are adjacent to one another within the second plurality of maglettes has a second angle magnitude between about 45 degrees and 30 degrees, and;
wherein an angle between a magnetic polarity vector of a first outer maglette of the first plurality of maglettes and the magnetic polarity vector of an adjacent second outer maglette of the second plurality of maglettes has a third angle magnitude between about 45 degrees and 90 degrees, where the third angle magnitude is different from the first and second angle magnitudes.

2. The armature of claim 1 wherein the first and the second angle magnitudes are substantially the same.

3. The armature of claim 1 wherein the first and the second magnetic structures comprise a first side of the armature.

4. The armature of claim 1 wherein the armature is substantially cylindrical in shape and each of the first and the second magnetic structures is one of substantially disk-shaped or ring-shaped.

5. The armature of claim 1 wherein at least two maglettes in the first magnetic structure differ in dimension and at least two maglettes in the second magnetic structures differ in dimension.

6. The armature of claim 1 wherein at least one of the first and the second plurality of maglettes comprises two outer maglettes and two inner maglettes, a magnitude of the angles of the magnetic polarity vectors of the outer maglettes relative to a perpendicular to a direction of motion of the armature is substantially 45 degrees, and a magnitude of the angles of the magnetic polarity vectors of the inner maglettes relative to a perpendicular to a direction of motion of the armature is substantially 15 degrees.

7. The armature of claim 1 wherein the first magnetic polarity of the first magnetic structure is substantially opposite to the second magnetic polarity of the second magnetic structure.

8. The armature of claim 1 wherein at least one of the pair of magnetic structures is magnetized as a whole.

9. A motor comprising:
an armature, the armature comprising;
a first and second magnetic structure forming a first spatial period of the armature;
(i) wherein the first magnetic structure has a first magnetic polarity and includes a first plurality of maglettes, the first plurality of maglettes comprising:
at least two outer maglettes and at least two inner maglettes, wherein at least two maglettes of the first plurality of maglettes are arranged adjacent to one another, each maglette of the first plurality of maglettes has associated therewith a magnetic polarity vector and wherein an angle between the magnetic polarity vectors of each pair of maglettes that are adjacent to one another within the first plurality of maglettes has a first angle magnitude between about 45 degrees and 30 degrees;
(ii) wherein the second magnetic structure is adjacent the first magnetic structure and has a second magnetic polarity that is different from the first magnetic polarity, the second magnetic structure comprising a second plurality of maglettes comprising:
at least two outer maglettes and at least two inner maglettes, wherein at least two maglettes of the second plurality of maglettes are arranged adjacent to one another, each maglette of the second plurality of maglettes has associated therewith a magnetic polarity vector, wherein an angle between the magnetic polarity vectors of each pair of maglettes that are adjacent to one another within the second plurality of maglettes has a second angle magnitude between about 45 degrees and 30 degrees;
wherein an angle between a magnetic polarity vector of a first outer maglette of the first plurality of maglettes and the magnetic polarity vector of an adjacent second outer maglette of the second plurality of maglettes has a third angle magnitude between about 45 degrees and 90 degrees, where the third angle magnitude is different from the first and second angle magnitudes; and
a stator positioned proximate to the armature.

10. The armature of claim 1 further comprising third and fourth magnetic structures forming a second spatial period equal to the first spatial period, each magnetic structure having a magnetic polarity,
the third magnetic structure comprising a third plurality of maglettes;
the fourth magnetic structure comprising a fourth plurality of maglettes;
wherein each maglette in the third plurality of maglettes is adjacent to a respective maglettes in the first plurality of maglettes, and each maglettes in the fourth plurality of maglettes is adjacent to a respective maglette in the second plurality of maglettes; and the magnetic polarity of the third magnetic structure is oriented in the same direction as the magnetic polarity of the first magnetic structure, and the magnetic polarity of the fourth magnetic structure is oriented in the same direction as the magnetic polarity of the second magnetic structure.

11. The armature of claim 3 wherein the armature further comprises a plurality of discrete sides, each of which comprises at least a pair of magnetic structures.

12. The armature of claim 6 wherein the first and the second magnetic structures comprise a first side of the armature, the armature further comprising a plurality of discrete sides wherein each of the plurality of discrete sides comprises at least a pair of magnetic structures.

13. The armature of claim 11 wherein the armature is substantially cylindrical in shape.

14. The armature of claim 6 wherein the armature is substantially cylindrical in shape.

* * * * *